United States Patent
Koseoglu et al.

(10) Patent No.: US 11,154,845 B1
(45) Date of Patent: Oct. 26, 2021

(54) HYDROCRACKING CATALYSTS CONTAINING USY AND BETA ZEOLITES FOR HYDROCARBON OIL AND METHOD FOR HYDROCRACKING HYDROCARBON OIL WITH HYDROCRACKING CATALYSTS

(71) Applicants: Saudi Arabian Oil Company, Dhahran (SA); JGC Catalysts and Chemicals Ltd., Kawasaki (JP); Japan Cooperation Center Petroleum, Tokyo (JP)

(72) Inventors: Omer Refa Koseoglu, Dhahran (SA); Robert Peter Hodgkins, Dhahran (SA); Mitsunori Watabe, Kanagawa (JP); Koji Uchida, Kanagawa (JP)

(73) Assignees: Saudi Arabian Oil Company, Dhahran (SA); JGC Catalysts and Chemicals Ltd., Kawasaki (JP); Japan Cooperation Center Petroleum, Tokyo (JP)

( * ) Notice: Subject to any disclaimer, the term of this patent is extended or adjusted under 35 U.S.C. 154(b) by 0 days.

(21) Appl. No.: 16/940,635

(22) Filed: Jul. 28, 2020

(51) Int. Cl.
*C10G 47/18* (2006.01)
*B01J 29/16* (2006.01)
(Continued)

(52) U.S. Cl.
CPC ............ *B01J 29/166* (2013.01); *B01J 21/12* (2013.01); *B01J 29/7215* (2013.01); *B01J 29/7415* (2013.01); *B01J 29/7615* (2013.01); *B01J 29/7815* (2013.01); *B01J 35/006* (2013.01); *B01J 35/1019* (2013.01); *B01J 35/1023* (2013.01); *B01J 35/1038* (2013.01); *B01J 35/1042* (2013.01); *C10G 47/18* (2013.01); *C10G 47/20* (2013.01); *B82Y 30/00* (2013.01)

(58) Field of Classification Search
None
See application file for complete search history.

(56) References Cited

U.S. PATENT DOCUMENTS

| | | |
|---|---|---|
| 3,523,914 A | 8/1970 | Mitsche et al. |
| 3,842,138 A | 10/1974 | Chahvekilian et al. |

(Continued)

FOREIGN PATENT DOCUMENTS

| | | |
|---|---|---|
| CA | 2041905 A1 | 11/1991 |
| CN | 101134576 A | 3/2008 |

(Continued)

OTHER PUBLICATIONS

Notice of Allowance and Fee(s) Due dated Jun. 9, 2021 pertaining to U.S. Appl. No. 16/985,588, filed Aug. 5, 2020, 35 pages.

(Continued)

*Primary Examiner* — Derek N Mueller
(74) *Attorney, Agent, or Firm* — Dinsmore & Shohl LLP (57) ABSTRACT

In accordance with one or more embodiments of the present disclosure, a catalyst composition includes a catalyst support and at least one hydrogenative metal component disposed on the catalyst support. The catalyst support includes at least one USY zeolite having a framework substituted with titanium and zirconium and at least one beta zeolite also having a framework substituted with titanium and zirconium. A method of using such a catalyst in a hydrocracking process is also disclosed.

20 Claims, 2 Drawing Sheets

(51) Int. Cl.
*C10G 47/20* (2006.01)
*B01J 29/72* (2006.01)
*B01J 29/74* (2006.01)
*B01J 29/76* (2006.01)
*B01J 35/10* (2006.01)
*B01J 35/00* (2006.01)
*B01J 21/12* (2006.01)
*B01J 29/78* (2006.01)
*B82Y 30/00* (2011.01)

(56) References Cited

U.S. PATENT DOCUMENTS

| | | | |
|---|---|---|---|
| 3,944,481 A | 3/1976 | Wing et al. | |
| 4,002,556 A | 1/1977 | Satchell | |
| 4,065,379 A | 12/1977 | Soonawala et al. | |
| 4,115,467 A | 9/1978 | Fowler | |
| 4,180,453 A | 12/1979 | Franck et al. | |
| 4,210,560 A | 7/1980 | Kehl | |
| 4,255,288 A | 3/1981 | Cull et al. | |
| 4,419,271 A | 12/1983 | Ward | |
| 4,698,322 A | 10/1987 | Santilli et al. | |
| 4,738,941 A | 4/1988 | Dufresne et al. | |
| 4,798,665 A | 1/1989 | Humbach et al. | |
| 4,826,586 A | 5/1989 | Herbst et al. | |
| 4,859,308 A | 8/1989 | Harandi et al. | |
| 5,057,203 A | 10/1991 | Chu et al. | |
| 5,185,484 A | 2/1993 | Del Rossi et al. | |
| 5,192,421 A | 3/1993 | Audeh et al. | |
| 5,258,117 A | 11/1993 | Kolstad et al. | |
| 5,264,635 A | 11/1993 | Le et al. | |
| 5,271,761 A | 12/1993 | Skeels et al. | |
| 5,414,175 A | 5/1995 | Cook | |
| 5,690,810 A | 11/1997 | Lawrence et al. | |
| 5,906,728 A | 5/1999 | Iaccino et al. | |
| 6,017,840 A | 1/2000 | Wu et al. | |
| 6,063,944 A | 5/2000 | Di Renzo et al. | |
| 6,132,494 A | 10/2000 | Kjos et al. | |
| 6,190,533 B1 | 2/2001 | Bradow et al. | |
| 6,210,561 B1 | 4/2001 | Bradow et al. | |
| 6,303,842 B1 | 10/2001 | Bridges et al. | |
| 6,632,351 B1 | 10/2003 | Ngan et al. | |
| 6,726,834 B2 | 4/2004 | Quesada et al. | |
| 6,762,143 B2 | 7/2004 | Shan et al. | |
| 7,084,087 B2 | 8/2006 | Shan et al. | |
| 7,220,887 B2 | 5/2007 | Stell et al. | |
| 7,331,746 B2 | 2/2008 | Wright et al. | |
| 7,408,093 B2 | 8/2008 | Stell et al. | |
| 7,550,405 B2 | 6/2009 | Shan et al. | |
| 7,700,005 B2 | 4/2010 | Inui et al. | |
| 7,951,745 B2 | 5/2011 | Zhou et al. | |
| 7,972,498 B2 | 7/2011 | Buchanan et al. | |
| 8,002,970 B2 | 8/2011 | Euzen et al. | |
| 8,008,226 B2 | 8/2011 | Inui et al. | |
| 8,070,938 B2 | 12/2011 | Stein et al. | |
| 8,071,833 B2 | 12/2011 | Grootjans et al. | |
| 8,148,285 B2 | 4/2012 | Kuroda et al. | |
| 8,884,088 B2 | 11/2014 | Smith et al. | |
| 9,108,190 B1 | 8/2015 | Fan et al. | |
| 9,221,036 B2 | 12/2015 | Koseoglu et al. | |
| 9,321,704 B2 | 4/2016 | Lattner et al. | |
| 9,499,403 B2 | 11/2016 | Al-Muhaish et al. | |
| 9,512,371 B2 | 12/2016 | Abe et al. | |
| 9,879,187 B2 | 1/2018 | Bhan | |
| 9,908,109 B2 | 3/2018 | Ravishankar et al. | |
| 10,053,401 B1 | 8/2018 | Beadle et al. | |
| 10,081,009 B2 | 9/2018 | Koseoglu et al. | |
| 10,137,442 B2 | 11/2018 | McGuire | |
| 10,293,332 B2 | 5/2019 | Koseoglu et al. | |
| 10,350,585 B1 | 7/2019 | Al-Herz et al. | |
| 10,357,761 B2 * | 7/2019 | Koseoglu | B01J 29/89 |
| 10,427,142 B1 | 10/2019 | Al-Herz et al. | |
| 10,494,574 B2 | 12/2019 | Akah et al. | |
| 10,941,354 B1 | 3/2021 | Hodgkins et al. | |
| 2003/0006168 A1 | 1/2003 | Ino et al. | |
| 2004/0004028 A1 | 1/2004 | Stell et al. | |
| 2004/0054247 A1 | 3/2004 | Powers | |
| 2005/0209093 A1 | 9/2005 | Chester et al. | |
| 2005/0232839 A1 | 10/2005 | Yaluris et al. | |
| 2005/0261530 A1 | 11/2005 | Stell et al. | |
| 2006/0021912 A1 | 2/2006 | Chen et al. | |
| 2007/0090018 A1 | 4/2007 | Keusenkothen et al. | |
| 2007/0090020 A1 | 4/2007 | Buchanan et al. | |
| 2007/0232846 A1 | 10/2007 | Baumgartner et al. | |
| 2009/0283443 A1 | 11/2009 | Kuroda et al. | |
| 2010/0087692 A1 | 4/2010 | Yoshimura et al. | |
| 2011/0042269 A1 | 2/2011 | Kuechler et al. | |
| 2011/0132804 A1 | 6/2011 | Stevenson et al. | |
| 2011/0174682 A1 | 7/2011 | Iaccino | |
| 2011/0247500 A1 | 10/2011 | Akhras et al. | |
| 2011/0251049 A1 | 10/2011 | Kuroda et al. | |
| 2012/0085681 A1 | 4/2012 | Abe et al. | |
| 2013/0046122 A1 | 2/2013 | Vermeiren et al. | |
| 2013/0175202 A1 | 7/2013 | Koseoglu et al. | |
| 2013/0319910 A1 | 12/2013 | Koseoglu et al. | |
| 2015/0111721 A1 | 4/2015 | Tian et al. | |
| 2015/0111722 A1 | 4/2015 | Long et al. | |
| 2015/0375218 A1 | 12/2015 | Koseoglu et al. | |
| 2017/0088490 A1 | 3/2017 | Chen et al. | |
| 2019/0093028 A1 | 3/2019 | Gong et al. | |
| 2019/0316044 A1 | 10/2019 | Koseoglu et al. | |
| 2020/0055025 A1 | 2/2020 | Kukade et al. | |

FOREIGN PATENT DOCUMENTS

| | | |
|---|---|---|
| CN | 101898144 A | 12/2010 |
| CN | 104549543 A | 4/2015 |
| CN | 106140289 A | 11/2016 |
| CN | 106145136 A | 11/2016 |
| EP | 703003 A1 | 3/1996 |
| EP | 2298445 A1 | 3/2011 |
| EP | 3406337 A1 | 11/2018 |
| GB | 1255544 A | 12/1971 |
| GB | 2114594 A | 8/1983 |
| JP | 58098387 A | 6/1983 |
| JP | 07308581 A | 11/1995 |
| JP | 2000334305 A | 12/2000 |
| JP | 2002255537 A | 9/2002 |
| JP | 2003226519 A | 8/2003 |
| WO | 8801254 A1 | 2/1988 |
| WO | 0104237 A2 | 1/2001 |
| WO | 2007047942 A2 | 4/2007 |
| WO | 2009088413 A1 | 7/2009 |
| WO | 2012018819 A1 | 2/2012 |
| WO | 2013057319 A2 | 4/2013 |
| WO | 2013123299 A1 | 8/2013 |
| WO | 2015179735 A1 | 11/2015 |
| WO | 2019147345 A1 | 8/2019 |

OTHER PUBLICATIONS

International Search Report and Written Opinion dated Mar. 31, 2021 pertaining to International application No. PCT/US2020/057484 filed Oct. 27, 2020, 14 pgs.

International Search Report and Written Opinion dated Apr. 9, 2021 pertaining to International application No. PCT/US2020/060860 filed Nov. 17, 2020, 12 pgs.

International Search Report and Written Opinion dated Apr. 13, 2021 pertaining to International application No. PCT/US2020/066520 filed Dec. 22, 2020, 12 pgs.

International Search Report and Written Opinion dated Apr. 21, 2021 pertaining to International application No. PCT/US2020/058208 filed Oct. 30, 2020, 12 pgs.

U.S. Office Action dated Jul. 6, 2021 pertaining to U.S. Appl. No. 16/936,990, filed Jul. 23, 2020, 35 pages.

U.S. Office Action dated Jul. 8, 2021 pertaining to U.S. Appl. No. 16/923,346, filed Jul. 8, 2020, 35 pages.

International Search Report and Written Opinion dated Mar. 17, 2021 pertaining to International application No. PCT/US2020/058682 filed Nov. 3, 2020, 16 pgs.

International Search Report pertaining to Application No. PCT/US2015/032129 dated Aug. 21, 2015.

(56) References Cited

OTHER PUBLICATIONS

Wang et al., "Characterization of titanium-modified USY zeolites and their catalytic performance on n-heptane cracking", Appl Catal A-Gen, vol. 214, No. 2, pp. 167-177, Jun. 29, 2001.
International Search Report pertaining to Application No. PCT/US2013/023337 dated Jun. 18, 2013.
International Search Report pertaining to Application No. PCT/US2018/064001 dated Feb. 18, 2019.
Hamdy et al., "Structural and photocatalytic properties of precious metals modified TiO2-BEA Zeolite composites", Molecular Catalysis, vol. 441, pp. 140-149, 2017.
Rakshe et al., "Acidity and m-Xylene Isomerization Activity of Large Pore, Zirconium-Containing Alumino-silicate with BEA Structure", Journal of Catalysis, vol. 188, pp. 252-260, 1999.
Reddy et al., "A Simple Method for the Preparation of Active Ti Beta Zeolite Catalysts", Catalysisby Microporous Materials, Studies int eh Surface Science and Catalysis, vol. 94, pp. 309-316, 1995.

* cited by examiner

HYDROCRACKING CATALYSTS CONTAINING USY AND BETA ZEOLITES FOR HYDROCARBON OIL AND METHOD FOR HYDROCRACKING HYDROCARBON OIL WITH HYDROCRACKING CATALYSTS

FIELD

Embodiments of the present disclosure generally relate to hydrocracking of hydrocarbon oil, and pertain particularly to a catalyst composition for hydrocracking of hydrocarbon oil and methods of using such catalyst compositions.

BACKGROUND

Hydrocracking processes are used commercially in a large number of petroleum refineries to process a variety of hydrocarbon feeds boiling in the range of 370° C. to 520° C. in conventional hydrocracking units and boiling at 520° C. and above in residue hydrocracking units. In general, hydrocracking processes split the molecules of the hydrocarbon feed into smaller, i.e., lighter, molecules having higher average volatility and economic value. Additionally, hydrocracking processes typically improve the quality of the hydrocarbon feedstock by increasing the hydrogen-to-carbon ratio and by removing organosulfur and organonitrogen compounds. The hydrocracking catalyst is a key feature of hydrocracking process technologies.

Two types of catalysts are used in hydrocracking: pretreat catalysts and cracking catalysts. Pretreat catalysts are designed to remove contaminants, such as sulfur and nitrogen, from the heavy hydrocarbon oil. Cracking catalysts are designed to split low-value heavy molecules into higher value transportation fuels. The cracking catalysts are typically composed of active phase metals for hydrogenation, amorphous support as a binder, and zeolites as a cracking component. Active phase metals typically include nickel, molybdenum, and tungsten. Exemplary zeolites include ultra-stable Y-type zeolites (USY zeolites). Beta zeolite may be added to the catalyst matrix for increased cracking activity and improvement of cold flow properties.

SUMMARY

There is a continual need for more effective hydrocracking catalyst compositions. It has been discovered that a catalyst composition including at least one framework-substituted ultra-stable Y-type (hereinafter "USY") zeolite and at least one framework-substituted beta zeolite may greatly enhance the effectiveness of hydrocracking processes.

According to one embodiment, a catalyst composition includes a catalyst support and at least one hydrogenative metal component disposed on the catalyst support. The catalyst support includes at least one USY zeolite having a framework substituted with titanium and zirconium and at least one beta zeolite also having a framework substituted with titanium and zirconium.

According to one embodiment, a method for hydrocracking hydrocarbon oil includes contacting at least one hydrocarbon oil stream with at least one hydrocracking catalyst composition and hydrogen in a reactor in order to hydrocrack the hydrocarbon oil stream. The hydrocracking catalyst composition includes a catalyst support and at least one hydrogenative metal component disposed on the catalyst support. The catalyst support includes at least one USY zeolite having a framework substituted with titanium and zirconium and at least one beta zeolite also having a framework substituted with titanium and zirconium.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

FIGURE (FIG.) 1 is UV-vis spectra for an unsubstituted beta-zeolite and a TiZr-beta zeolite, according to one or more embodiments presently described.

DETAILED DESCRIPTION

In embodiments, a catalyst composition includes a catalyst support and at least one hydrogenative metal component disposed on the catalyst support. The catalyst support includes at least one USY zeolite having a framework substituted with titanium and zirconium (hereinafter "TiZr-USY zeolite") and at least one beta zeolite also having a framework substituted with titanium and zirconium ("hereinafter "TiZr-beta zeolite"). Embodiments of the method will now be described in further detail.

As used herein, the term "hydrocarbon oil" or "hydrocarbon feedstock" refers to an oily liquid composed mostly of a mixture of hydrocarbon compounds. Hydrocarbon oil may include refined oil obtained from crude oil, synthetic crude oil, bitumen, oil sand, shale oil, or coal oil. The term "refined oil" includes, but is not limited to, vacuum gas oil (VGO), deasphalted oil (DAO) obtained from a solvent deasphalting process, demetallized oil (DMO), light and/or heavy coker gas oil obtained from a coker process, cycle oil obtained from a fluid catalytic cracking (FCC) process, and gas oil obtained from a visbreaking process.

As used herein, the term "hydrocarbon" refers to a chemical compound composed entirely of carbon and hydrogen atoms.

As used herein, the term "crystal lattice constant" refers to a physical dimension of unit cells in a crystal lattice. The crystal lattice constant can be determined by ASTM D3942-03, entitled "Standard Test Method for Determination of the Unit Cell Dimension of a Faujasite-Type Zeolite," the entire content of which is incorporated herein by reference. Zeolite beta has a tetragonal crystal system. Crystals having a tetragonal system have three mutually perpendicular axes, two of which are equal in length. A crystalline structure can be defined in terms of its simplest repeating unit, the unit cell, that is defined by three translations, a, b and c, and three angles $\alpha$, $\beta$ and $\gamma$. It is often convenient to refer to lattice planes that pass through lattice points (identical points in space) in the structure. The reciprocal of the intercepts of these lattice planes on the three axes (x, y, z) are known as the Miller indices (h, k, l) and describe the three dimensional lattice plane. The spacing between adjacent lattice planes, which has particular relevance in description of diffraction, is designated dhkl. For a tetragonal, lattice parameters include:

$$a=b\neq c$$

$$\alpha=\beta=\gamma=90°$$

where a is the unit cell dimension relevant to h in Å, b is the unit cell dimension relevant to k in Å, and c is the unit cell dimension relevant to l in Å. The crystal lattice constant for the beta zeolite is determined based on a tetragonal unit cell using the following equation:

$$\frac{1}{d^2} = \frac{h^2+k^2}{a^2} + \frac{l^2}{c^2}$$

where a, b, c, h, k, and l are as defined above and d is the interplanar spacing specific to a given plane in Å.

As used herein, the term "specific surface area" refers to the total surface area of the zeolite or catalyst per unit of mass. The specific surface area can be determined by ASTM D3663-03, entitled "Standard Test Method for Surface Area of Catalysts and Catalyst Carriers," the entire content of which is incorporated herein by reference. Alternatively, the specific surface area may be determined using the Brunauer-Emmett-Teller ("BET") model. Alternatively, the specific surface area can be determined by ASTM D4365-19, entitled "Standard Test Method for Determining Micropore Volume and Zeolite Area of a Catalyst," the entire content of which is incorporated herein by reference.

As used herein, the term "hydrogen/oil ratio" or "hydrogen-to-oil ratio" refers to a standard measure of the volume rate of hydrogen circulating through the reactor with respect to the volume of feed. The hydrogen/oil ratio may be determined by comparing the flow volume of the hydrogen gas stream and the flow volume of the hydrocarbon feed using standard flow meters.

As used herein, the term "liquid hourly space velocity" or "LHSV" refers to the ratio of the liquid flow rate of the hydrocarbon feed to the catalyst volume or mass.

In one aspect, a catalyst composition may include a catalyst support and at least one hydrogenative metal component. In embodiments, the catalyst composition may comprise from 60 wt. % to 99.99 wt. % support. For example, the catalyst composition may comprise from 65 wt. % to 95 wt. %, from 60 wt. % to 90 wt. %, from 65 wt. % to 85 wt. %, or even from 70 wt. % to 80 wt. % support. It should be understood that the catalyst composition may comprise an amount of the support in a range formed from any of the lower bounds for such a range described herein to any of the upper bounds for such a range described herein. In embodiments, the catalyst composition may comprise from 0.01 wt. % to 40 wt. % hydrogenative metal component. For example, the catalyst composition may comprise from 1 wt. % to 40 wt. %, from 5 wt. % to 35 wt. %, from 10 wt. % to 30 wt. %, or even from 15 wt. % to 25 wt. % hydrogenative metal component. It should be understood that the catalyst composition may comprise an amount of the hydrogenative metal component in a range formed from any of the lower bounds for such a range described herein to any of the upper bounds for such a range described herein. Without intending to be bound by any particular theory, it is believed that hydrogenation metal dispersion on the catalyst is not optimum when the amount of hydrogenative component in the catalyst composition is too large relative to the amount of support. For example, the hydrogenation metal may agglomerate on the support when the catalyst composition comprises more than 40 wt. % hydrogenative component.

The catalyst support may include at least one USY zeolite and at least one beta zeolite. Each type of zeolite may have a framework substituted with titanium and zirconium. In embodiments, the framework substitution may be accomplished by a post-modification process in which the zeolite is subjected to dealumination followed by insertion of transition metals, such as Ti and/or Zr. As a result, a zeolite that has been framework substituted with titanium and zirconium may have a greater silica-to-alumina ratio (hereinafter "SAR") relative to the unsubstituted zeolite. Without intending to be bound by any particular theory, it is believed that this post-modification generates mesoporosity, which imbues the zeolite with the ability to accept large molecules inside the pores. As used herein, the term "mesoporosity" means that the zeolite contains a plurality of pores having diameters from 2 nm to 50 nm. Also, the mesoporosity is believed to increase the number of medium strength acid sites while decreasing the number of strong acid sites and to enhance the dispersion of the hydrogenative metal on the catalyst surface.

In embodiments, post-modification of the zeolite, either USY or beta, may be accomplished by the following process. The zeolite may be placed in a suspension in a liquid, such that the ratio of the mass of the liquid to the solid zeolite is from 5 to 15. An inorganic acid or organic acid may be added to the suspension so that the suspension has a pH of less than 2. At least one zirconium compound and at least one titanium compound are added to this acidic suspension, which is then mixed and neutralized to secure the post-modified catalyst. An exemplary process for preparing a USY zeolite framework substituted with titanium and zirconium is described in U.S. Pat. No. 10,293,332, the entire content of which is incorporated herein by reference. An exemplary process for preparing a beta zeolite framework substituted with titanium and zirconium is described in U.S. Ser. No. 16/589,719, filed Oct. 1, 2019, the entire content of which is incorporated herein by reference.

Framework substitution may be monitored, for example, by ultraviolet, visible, and near-infrared spectrophotometry (UV-Vis-NIR or UV-vis), Fourier transform infrared spectroscopy (FT-IR), or nuclear magnetic resonance spectrometry (NMR). For instance, it is known that zirconium atoms produce a characteristic effect in the UV-vis spectrum of TiZr-beta zeolite in the range of about 200 to about 220 nm.

In embodiments, the USY zeolite and the beta zeolite may be independently substituted with from 0.1 wt. % to 5 wt. % zirconium and from 0.1 wt. % to 5 wt. % titanium, in both instances calculated on an oxide basis. For instance, the USY zeolite and the beta zeolite may be independently substituted with from 0.5 wt. % to 4.5 wt. % zirconium and from 0.5 wt. % to 4.5 wt. % titanium, from 1 wt. % to 4 wt. % zirconium and from 1 wt. % to 4 wt. % titanium, from 1.5 wt. % to 3.5 wt. % zirconium and from 1.5 wt. % to 3.5 wt. % titanium, and even from 2 wt. % to 3 wt. % zirconium and from 2 wt. % to 3 wt. % titanium. It should be understood that any amount of zirconium-substitution described herein can be used in conjunction with any amount of titanium-substitution described herein. Further, it should be understood that the range of either zirconium or titanium substitution may be formed from any of the lower bounds of such substitution described herein and any of the upper bounds of such substitution described herein.

Without intending to be bound by any particular theory, it is believed the addition of the zirconium compound and/or the titanium compound at an amount of less than 0.1 wt. % fails to improve the solid acid properties of the zeolite.

Conversely, the addition of the zirconium compound and/or the titanium compound in an amount exceeding 5 wt. % does not improve the zeolite activity further and may create an unnecessary increase in cost of the resulting catalyst.

In embodiments, the TiZr-USY zeolite may have a crystal lattice constant from 2.43 nm to 2.45 nm. For example, the crystal lattice constant of the TiZr-USY zeolite may be from 2.431 nm to 2.449 nm, from 2.432 nm to 2.448 nm, from 2.433 nm to 2.447 nm, from 2.434 nm to 2.446 nm, from 2.435 nm to 2.445 nm, from 2.436 nm to 2.444 nm, from 2.437 nm to 2.443 nm, from 2.438 nm to 2.442 nm, or even from 2.439 nm to 2.441 nm. It should be understood that the crystal lattice constant of the TiZr-USY zeolite may be in a range formed from any one of the lower bounds for such crystal lattice constant described herein to any one of the upper bounds for such crystal lattice constant described herein. The TiZr-beta zeolite may have a crystal lattice constant of a=from 1.26 nm to 1.27 nm, b=from 1.26 nm to 1.27 nm, and c=from 26.2 nm to 26.5 nm or a=from 1.263 nm to 1.267 nm, b=from 1.263 nm to 1.263 nm, and c=from 26.3 nm to 26.4 nm. It should be understood that the crystal lattice constant of the TiZr-beta zeolite may be in a range formed from any one of the lower bounds for such crystal lattice constant described herein to any one of the upper bounds for such crystal lattice constant described herein.

Without intending to be bound by any particular theory, it is believed that a crystal lattice constant for the TiZr-USY zeolite of less than 2.43 nm may result in a reduction in the activity of the ultimately formed hydrocracking catalyst. Such reduction is believed to be the result of a high $SiO_2/Al_2O_3$ molar ratio in the framework structure of the zeolite and a small number of solid acid sites serving as active sites for the decomposition of hydrocarbons. Conversely, a crystal lattice constant for the TiZr-USY zeolite exceeding 2.45 nm may result in breakage of the crystal structure of the TiZr-USY zeolite during a hydrocracking reaction because of a low heat resistance of the TiZr-USY zeolite. The breakage of the crystal structure of the TiZr-USY zeolite may result in a reduction in the activity of the ultimately formed hydrocracking catalyst composition. Without intending to be bound by any particular theory, it is believed that similar effects may be observed above the maximum crystal lattice constants described above for TiZr-beta zeolite and below the minimum crystal lattice constants described above for TiZr-beta zeolite.

In embodiments, the TiZr-USY zeolite may have a specific surface area from 600 $m^2/g$ to 900 $m^2/g$. For example, the specific surface area of the TiZr-USY zeolite may be from 610 $m^2/g$ to 890 $m^2/g$, from 620 $m^2/g$ to 880 $m^2/g$, from 630 $m^2/g$ to 870 $m^2/g$, from 640 $m^2/g$ to 860 $m^2/g$, from 650 $m^2/g$ to 850 $m^2/g$, from 660 $m^2/g$ to 840 $m^2/g$, from 670 $m^2/g$ to 830 $m^2/g$, from 680 $m^2/g$ to 820 $m^2/g$, from 690 $m^2/g$ to 810 $m^2/g$, from 700 $m^2/g$ to 800 $m^2/g$, from 710 $m^2/g$ to 790 $m^2/g$, from 720 $m^2/g$ to 780 $m^2/g$, from 730 $m^2/g$ to 770 $m^2/g$, or even from 740 $m^2/g$ to 760 $m^2/g$. It should be understood that the specific surface area of the TiZr-USY zeolite may be in a range formed from any one of the lower bounds for such specific surface area described herein to any one of the upper bounds for such specific surface area described herein. The TiZr-beta zeolite may have a specific surface area from 400 $m^2/g$ to 800 $m^2/g$. For example, the specific surface area of the TiZr-beta zeolite may be from 410 $m^2/g$ to 790 $m^2/g$, from 420 $m^2/g$ to 780 $m^2/g$, from 430 $m^2/g$ to 770 $m^2/g$, from 440 $m^2/g$ to 760 $m^2/g$, from 450 $m^2/g$ to 750 $m^2/g$, from 460 $m^2/g$ to 740 $m^2/g$, from 470 $m^2/g$ to 730 $m^2/g$, from 480 $m^2/g$ to 720 $m^2/g$, from 490 $m^2/g$ to 710 $m^2/g$, from 500 $m^2/g$ to 700 $m^2/g$, from 510 $m^2/g$ to 690 $m^2/g$, from 520 $m^2/g$ to 680 $m^2/g$, from 530 $m^2/g$ to 670 $m^2/g$, from 540 $m^2/g$ to 660 $m^2/g$, from 550 $m^2/g$ to 650 $m^2/g$, from 560 $m^2/g$ to 640 $m^2/g$, from 570 $m^2/g$ to 630 $m^2/g$, from 580 $m^2/g$ to 620 $m^2/g$, or even from 590 $m^2/g$ to 610 $m^2/g$. It should be understood that the specific surface area of the TiZr-beta zeolite may be in a range formed from any one of the lower bounds for such specific surface area described herein to any one of the upper bounds for such specific surface area described herein.

Without intending to be bound by any particular theory, it is believed that a specific surface area of the TiZr-USY zeolite of less than 600 $m^2/g$ and/or a specific surface area of the TiZr-beta zeolite of less than may result in a reduction in the number of available solid acid sites, thereby reducing the catalyst activity of the resulting hydrocracking catalyst composition to an unsatisfactory level.

In embodiments, the catalyst composition comprising the TiZr-USY zeolite and the TiZr-beta zeolite may have a specific surface area from 200 $m^2/g$ to 450 $m^2/g$. For example, the specific surface area of the catalyst composition comprising the TiZr-USY zeolite and the TiZr-beta zeolite may be from 210 $m^2/g$ to 440 $m^2/g$, from 220 $m^2/g$ to 430 $m^2/g$, from 230 $m^2/g$ to 420 $m^2/g$, from 240 $m^2/g$ to 410 $m^2/g$, from 250 $m^2/g$ to 400 $m^2/g$, from 260 $m^2/g$ to 390 $m^2/g$, from 270 $m^2/g$ to 380 $m^2/g$, from 280 $m^2/g$ to 370 $m^2/g$, from 290 $m^2/g$ to 360 $m^2/g$, from 300 $m^2/g$ to 350 $m^2/g$, from 310 $m^2/g$ to 340 $m^2/g$, or even from 320 $m^2/g$ to 330 $m^2/g$. It should be understood that the specific surface area of the catalyst composition comprising the TiZr-USY zeolite and the TiZr-beta zeolite may be in a range formed from any one of the lower bounds for such specific surface area described herein to any one of the upper bounds for such specific surface area described herein. Without intending to be bound by any particular theory, it is believed that the hydrocracking rate is reduced when the specific surface area is less than 200 $m^2/g$, and the yield of the middle distillate is reduced. If, however, the specific surface area exceeds 450 $m^2/g$, the hydrocracking rate may grow too high, and the product selectivity may be changed unfavorably.

In embodiments, the TiZr-USY zeolite may have a molar ratio of $SiO_2$ to $Al_2O_3$ from 10 to 100. For example, the TiZr-USY zeolite may have a molar ratio of $SiO_2$ to $Al_2O_3$ from 11 to 99, from 12 to 98, from 13 to 97, from 14 to 96, from 15 to 95, from 16 to 94, from 17 to 93, from 18 to 92, from 19 to 91, from 20 to 90, from 21 to 89, from 22 to 88, from 23 to 87, from 24 to 86, from 25 to 85, from 26 to 84, from 27 to 83, from 28 to 82, from 29 to 81, from 30 to 80, from 31 to 79, from 32 to 78, from 33 to 77, from 34 to 76, from 35 to 75, from 36 to 74, from 37 to 73, from 38 to 72, from 39 to 71, from 40 to 70, from 41 to 69, from 42 to 68, from 43 to 67, from 44 to 66, from 45 to 65, from 46 to 64, from 47 to 63, from 48 to 62, from 49 to 61, from 50 to 60, from 51 to 59, from 52 to 58, from 53 to 57, or even from 54 to 56. It should be understood that the ratio of $SiO_2$ to $Al_2O_3$ of the TiZr-USY zeolite may be in a range formed from any one of the lower bounds for such ratio described herein to any one of the upper bounds for such ratio described herein.

In embodiments, the TiZr-beta zeolite may have a molar ratio of $SiO_2$ to $Al_2O_3$ from 10 to 200. For example, the TiZr-beta zeolite may have a molar ratio of $SiO_2$ to $Al_2O_3$ from 15 to 195, from 20 to 190, from 25 to 185, from 20 to 180, from 25 to 175, from 30 to 170, from 35 to 165, from 40 to 160, from 45 to 155, from 50 to 150, from 55 to 145, from 60 to 140, from 65 to 135, from 70 to 130, from 75 to 125, from 80 to 120, from 85 to 115, from 90 to 110, or even from 95 to 105. It should be understood that the ratio of $SiO_2$ to $Al_2O_3$ of the TiZr-beta zeolite may be in a range formed from any one of the lower bounds for such ratio described herein to any one of the upper bounds for such ratio described herein.

In embodiments, the catalyst composition comprising the TiZr-USY zeolite and the TiZr-beta zeolite may include a plurality of pores having a diameter of 600 Å or less. These pores having a diameter of 600 Å or less have a volume from 0.4 ml/g to 0.75 ml/g. For example the pore volume may be in the range from 0.41 ml/g to 0.74 ml/g, from 0.42 ml/g to 0.73 ml/g, from 0.43 ml/g to 0.72 ml/g, from 0.44 ml/g to 0.71 ml/g, from 0.45 ml/g to 0.7 ml/g, from 0.46 ml/g to 0.69 ml/g, from 0.47 ml/g to 0.68 ml/g, from 0.48 ml/g to 0.67 ml/g, from 0.49 ml/g to 0.66 ml/g, from 0.5 ml/g to 0.65 ml/g, from 0.51 ml/g to 0.64 ml/g, from 0.52 ml/g to 0.63 ml/g, from 0.53 ml/g to 0.62 ml/g, from 0.54 ml/g to 0.61 ml/g, from 0.55 ml/g to 0.6 ml/g, from 0.56 ml/g to 0.59 ml/g, or even from 0.57 ml/g to 0.58 ml/g. It should be understood that the pore volume of pores of the catalyst composition comprising the TiZr-USY zeolite and the TiZr-beta zeolite having a diameter of 600 Å or less may be in a range formed from any one of the lower bounds for such pore volume described herein to any one of the upper bounds for such pore volume described herein.

Without intending to be bound by any particular theory, it is believed that the specific surface area is reduced if the pore volume is less than 0.40 ml/g. As a result, the hydrocracking catalyst activity and yield of the middle distillate are reduced. Conversely, if the pore volume exceeds 0.75 ml/g, the specific surface area is elevated. As a result, the hydrocracking rate and the product selectivity may be changed unfavorably.

In embodiments, the support may include from 70 wt. % to 99 wt. % TiZr-USY zeolite and from 1 wt. % to 30 wt. % TiZr-beta zeolite, based on the total zeolite content of the support. For example, the support may include from 71 wt. % to 98 wt. %, from 72 wt. % to 97 wt. %, from 73 wt. % to 96 wt. %, from 74 wt. % to 95 wt. %, from 75 wt. % to 94 wt. %, from 76 wt. % to 93 wt. %, from 77 wt. % to 92 wt. %, from 78 wt. % to 91 wt. %, from 79 wt. % to 90 wt. %, from 80 wt. % to 89 wt. %, from 81 wt. % to 88 wt. %, from 82 wt. % to 87 wt. %, from 83 wt. % to 86 wt. %, or even from 84 wt. % to 85 wt. % TiZr-USY zeolite. For further example, the support may include from 2 wt. % to 29 wt. %, from 3 wt. % to 28 wt. %, from 4 wt. % to 27 wt. %, from 5 wt. % to 26 wt. %, from 6 wt. % to 25 wt. %, from 7 wt. % to 24 wt. %, from 8 wt. % to 23 wt. %, from 9 wt. % to 22 wt. %, from 10 wt. % to 21 wt. %, from 11 wt. % to 20 wt. %, from 12 wt. % to 19 wt. %, from 13 wt. % to 18 wt. %, from 14 wt. % to 17 wt. %, or even from 15 wt. % to 16 wt. % TiZr-beta zeolite. It should be understood that any amount of TiZr-USY zeolite described herein can be used in conjunction with any amount of TiZr-beta zeolite described herein. Further, it should be understood that the range of either TiZr-USY zeolite or TiZr-beta zeolite may be formed from any of the lower bounds of such zeolite content described herein and any of the upper bounds of such zeolite content described herein.

In embodiments, the hydrogenative metal component may include one or more metals of Groups 6 and 8-11 of the Periodic Table of Elements, as numbered by the International Union of Pure and Applied Chemistry as of April 2020. For example, the hydrogenative metal component may include one or more of chromium, molybdenum, tungsten, iron, cobalt, nickel, copper, ruthenium, rhodium, palladium, silver, osmium, iridium, platinum, and gold.

In embodiments, the catalyst composition may include other additives. For instance, the catalyst composition may include one or more inorganic oxide in addition to the zeolites described above. The inorganic oxide may act as a granulating agent or a binder. Exemplary inorganic oxides include, but are not limited to, alumina, silica, titania, silica-alumina, alumina-titania, alumina-zirconia, alumina-boria, phosphorus-alumina, silica-alumina-boria, phosphorus-alumina-boria, phosphorus-alumina-silica, silica-alumina-titania, and silica-alumina-zirconia.

In embodiments, the one or more inorganic oxide may comprise a component of the support. In embodiments, the framework-substituted zeolites present may comprise from 1 wt. % to 80 wt. %, from 10 wt. % to 75 wt. %, from 20 wt. % to 70 wt. %, or even from 30 wt. % to 60 wt. % of the support. In embodiments, the inorganic oxide content may comprise from 98 wt. % to 20 wt. %, from 90 wt. % to 25 wt. %, from 80 wt. % to 30 wt. %, or even from 70 wt. % to 40 wt. % of the support. It should be understood that the framework-substituted zeolites may be present in a range formed from any one of the lower bounds for such concentration described herein to any one of the upper bounds for such concentration described herein. It should be further understood that the inorganic oxide may be present in a range formed from any one of the lower bounds for such concentration described herein to any one of the upper bounds for such concentration described herein. Without intending to be bound by any particular theory, it is believed that the mechanical strength of the catalyst may be decreased if the amount of binder falls below 20 wt. %, and the cracking capability of the catalyst may be decreased if the zeolite content falls below 2 wt. %.

In another aspect, a method for hydrocracking hydrocarbon oil includes contacting at least one hydrocarbon oil stream with at least one hydrocracking catalyst composition and hydrogen in a reactor in order to hydrocrack the hydrocarbon oil stream. The hydrocracking catalyst may be as described above. That is, the hydrocracking catalyst may include a catalyst support and at least one hydrogenative metal component disposed on the catalyst support. The catalyst support may include at least one TiZr-USY zeolite and at least one TiZr-beta zeolite.

The reactor may operate within a temperature range from 300° C. to 500° C. For example, the reactor may operate within a temperature range from 310° C. to 490° C., from 320° C. to 480° C., from 330° C. to 470° C., from 340° C. to 460° C., from 350° C. to 450° C., from 360° C. to 440° C., from 370° C. to 430° C., from 380° C. to 420° C., from 390° C. to 410° C., or even from 395° C. to 405° C. It should be understood that the reactor may operate within a temperature range formed from any one of the lower bounds of such temperature described herein and any one of the upper bounds of such temperature described herein.

The hydrocarbon oil may have a boiling point from 375° C. to 833° C. For example, the hydrocarbon oil may have a boiling point from 400° C. to 800° C., from 450° C. to 750° C., from 500° C. to 700° C., from 550° C. to 650° C., or even from 575° C. to 625° C. It should be understood that the hydrocarbon oil may have a boiling point within a temperature range formed from any one of the lower bounds of such temperature described herein and any one of the upper bounds of such temperature described herein.

Hydrogen may be used to produce saturated hydrocarbons during the hydrocracking process. The hydrogen may be added to the reactor at a pressure from 3.5 MPa to 35 MPa.

For example, the hydrogen may be added to the reactor at a pressure from 4 MPa to 34.5 MPa, from 4.5 MPa to 34 MPa, from 5 MPa to 33.5 MPa, from 5.5 MPa to 33 MPa, from 6 MPa to 32.5 MPa, from 6.5 MPa to 32 MPa, from 7 MPa to 31.5 MPa, from 7.5 MPa to 31 MPa, from 8 MPa to 30.5 MPa, from 8.5 MPa to 30 MPa, from 9 MPa to 29.5 MPa, from 9.5 MPa to 29 MPa, from 10 MPa to 28.5 MPa, from 10.5 MPa to 28 MPa, from 11 MPa to 27.5 MPa, from 11.5 MPa to 27 MPa, from 12 MPa to 26.5 MPa, from 12.5 MPa to 26 MPa, from 13 MPa to 25.5 MPa, from 13.5 MPa to 25 MPa, from 14 MPa to 24.5 MPa, from 14.5 MPa to 24 MPa, from 15 MPa to 23.5 MPa, from 15.5 MPa to 23 MPa, from 16 MPa to 22.5 MPa, from 16.5 MPa to 22 MPa, from 17 MPa to 21.5 MPa, from 17.5 MPa to 21 MPa, from 18 MPa to 20.5 MPa, from 18.5 MPa to 20 MPa, or even from 19 MPa to 19.5 MPa. It should be understood that the hydrogen may be added to the reactor in a range of pressure from any one of the lower bounds of such pressure described herein to any one of the upper bounds of such pressure described herein. Without intending to be bound by any particular theory, it is believed that the process performance will be significantly reduced at lower hydrogen pressure. Conversely, it is believed that processes using high hydrogen pressure require specialized equipment that may significantly increase the cost of the process.

The hydrogen feed and hydrocarbon oil feeds may be adjusted such that the hydrogen/oil ratio in the reactor may be from 500 normal cubic meters per cubic meter (hereinafter "$Nm^3/m^3$") to 2500 $Nm^3/m^3$, with normal cubic meters being defined as the volume in cubic meters at standard temperature and pressure (0° C. and 0.1 MPa). For example, the hydrogen/oil ratio may be from 550 $Nm^3/m^3$ to 2450 $Nm^3/m^3$, from 600 $Nm^3/m^3$ to 2400 $Nm^3/m^3$, from 650 $Nm^3/m^3$ to 2350 $Nm^3/m^3$, from 700 $Nm^3/m^3$ to 2300 $Nm^3/m^3$, from 750 $Nm^3/m^3$ to 2250 $Nm^3/m^3$, from 800 $Nm^3/m^3$ to 2200 $Nm^3/m^3$, from 850 $Nm^3/m^3$ to 2150 $Nm^3/m^3$, from 900 $Nm^3/m^3$ to 2100 $Nm^3/m^3$, from 950 $Nm^3/m^3$ to 2050 $Nm^3/m^3$, from 1000 $Nm^3/m^3$ to 2000 $Nm^3/m^3$, from 1050 $Nm^3/m^3$ to 1950 $Nm^3/m^3$, from 1100 $Nm^3/m^3$ to 1900 $Nm^3/m^3$, from 1150 $Nm^3/m^3$ to 1850 $Nm^3/m^3$, from 1200 $Nm^3/m^3$ to 1800 $Nm^3/m^3$, from 1250 $Nm^3/m^3$ to 1750 $Nm^3/m^3$, from 1300 $Nm^3/m^3$ to 1700 $Nm^3/m^3$, from 1250 $Nm^3/m^3$ to 1650 $Nm^3/m^3$, from 1300 $Nm^3/m^3$ to 1500 $Nm^3/m^3$, or even from 1350 $Nm^3/m^3$ to 1450 $Nm^3/m^3$. It should be understood that the hydrogen/oil ratio may be in a range of ratios from any one of the lower bounds of such ratio described herein to any one of the upper bounds of such ratio described herein. Without intending to be bound by any particular theory, it is believed that the process performance will be significantly reduced at a lower hydrogen/oil ratio. Conversely, it is believed that processes using a high hydrogen/oil ratio require specialized equipment that may significantly increase the cost of the process and may increase the gas holdup in the system thereby decreasing process performance.

The liquid hourly space velocity (hereinafter "LHSV") of the hydrocarbon feed in the reactor may be from 0.1 per hour to 10 per hour. For example, the liquid hourly space velocity may be from 0.5 per hour to 9.5 per hour, from 1 per hour to 9 per hour, from 1.5 per hour to 8.5 per hour, from 2 per hour to 8 per hour, from 2.5 per hour to 7.5 per hour, from 3 per hour to 7 per hour, from 3.5 per hour to 6.5 per hour, from 4 per hour to 6 per hour, or even from 4.5 per hour to 5.5 per hour. It should be understood that the LHSV may be in a range formed from any one of the lower bounds for the LHSV described herein to any one of the upper bounds for the LHSV described herein.

As noted above, the method for hydrocracking may take place in one or more reactors. Flow reactors are well-suited for this process, although the subject matter described herein is not so limited. Exemplary flow reactors include, but are not limited to, a stirred tank reactor, an ebullient bed reactor, a baffled slurry tank, a fixed bed reactor, a rotating tubular reactor, a slurry-bed reactor, and a combination of two or more of these.

According to an aspect, either alone or in combination with any other aspect, a catalyst composition includes a catalyst support and at least one hydrogenative metal component disposed on the catalyst support. The catalyst support includes at least one USY zeolite having a framework substituted with titanium and zirconium (TiZr-USY zeolite) and at least one beta zeolite also having a framework substituted with titanium and zirconium (TiZr-beta zeolite).

According to a second aspect, either alone or in combination with any other aspect, the at least one TiZr-USY zeolite and the at least one TiZr-beta zeolite are each independently substituted with from 0.1 wt. % to 5 wt. % zirconium atoms and from 0.1 wt. % to 5 wt. % titanium calculated on an oxide basis.

According to a third aspect, either alone or in combination with any other aspect, the at least one hydrogenative metal component is selected from the group consisting of chromium, molybdenum, tungsten, iron, cobalt, nickel, copper, ruthenium, rhodium, palladium, silver, osmium, iridium, platinum, gold, and a combination of two more thereof.

According to a fourth aspect, either alone or in combination with any other aspect, the at least one TiZr-USY zeolite comprises a crystal lattice constant from 2.43 nm to 2.45 nm.

According to a fifth aspect, either alone or in combination with any other aspect, the at least one TiZr-USY zeolite comprises a specific surface area from 600 $m^2/g$ to 900 $m^2/g$.

According to a sixth aspect, either alone or in combination with any other aspect, the catalyst composition comprising the at least one TiZr-USY zeolite and the at least one TiZr-beta zeolite comprises a specific surface area from 200 $m^2/g$ to 450 $m^2/g$.

According to a seventh aspect, either alone or in combination with any other aspect, the at least one TiZr-USY zeolite comprises a molar ratio of $SiO_2$ to $Al_2O_3$ from 10 to 100.

According to an eighth aspect, either alone or in combination with any other aspect, the catalyst composition comprising the at least one TiZr-USY zeolite and the at least one TiZr-beta zeolite comprises a plurality of pores having a diameter of 600 Å or less, the pores having a volume from 0.4 ml/g to 0.75 ml/g.

According to a ninth aspect, either alone or in combination with any other aspect, the at least one hydrogenative metal component comprises from 0.01 wt. % to 40 wt. % of the catalyst composition.

According to a tenth aspect, either alone or in combination with any other aspect, the at least one TiZr-beta zeolite comprises a crystal lattice constant of a=from 1.26 nm to 1.27 nm, b=from 1.26 nm to 1.27 nm, and c=from 26.2 nm to 26.5 nm.

According to an eleventh aspect, either alone or in combination with any other aspect, the at least one TiZr-beta zeolite comprises a specific surface area from 400 $m^2/g$ to 800 $m^2/g$.

According to a twelfth aspect, either alone or in combination with any other aspect, the at least one TiZr-beta zeolite comprises a molar ratio of $SiO_2$ to $Al_2O_3$ from 10 to 200.

According to a thirteenth aspect, either alone or in combination with any other aspect, the catalyst support comprises from 70 wt. % to 99 wt. % TiZr-USY zeolite, based on the total zeolite content of the support.

According to a fourteenth aspect, either alone or in combination with any other aspect, the catalyst support comprises from 1 wt. % to 30 wt. % TiZr-beta zeolite, based on the total zeolite content of the support.

According to a fifteenth aspect, either alone or in combination with any other aspect, the catalyst support comprises from 1 wt. % to 80 wt. % total TiZr-USY zeolite and TiZr-beta zeolite.

According to a sixteenth aspect, either alone or in combination with any other aspect, a method for hydrocracking hydrocarbon oil includes contacting at least one hydrocarbon oil stream with at least one hydrocracking catalyst composition and hydrogen in a reactor in order to hydrocrack the hydrocarbon oil stream. The hydrocracking catalyst composition includes a catalyst support and at least one hydrogenative metal component disposed on the catalyst support. The catalyst support includes at least one TiZr-USY zeolite and at least one TiZr-beta zeolite.

According to a seventeenth aspect, either alone or in combination with any other aspect, the reactor operates at a temperature from 300° C. to 500° C.

According to an eighteenth aspect, either alone or in combination with any other aspect, the hydrocarbon oil has a boiling point from 375° C. to 833° C.

According to a nineteenth aspect, either alone or in combination with any other aspect, the hydrogen is added to the reactor at a pressure from 3.5 MPa to 35 MPa.

According to a twentieth aspect, either alone or in combination with any other aspect, the reactor has a hydrogen/oil ratio from 500 $Nm^3/m^3$ to 2500 $Nm^3/m^3$.

According to a twenty-first aspect, either alone or in combination with any other aspect, the reactor has a liquid hourly space velocity from 0.1 per hour to 10 per hour.

According to a twenty-second aspect, either alone or in combination with any other aspect, the reactor comprises a flow reactor selected from the group consisting of a stirred tank reactor, an ebullient bed reactor, a baffled slurry tank, a fixed bed reactor, a rotating tubular reactor, a slurry-bed reactor, and a combination of two or more of these.

EXAMPLES

Using embodiments described above, an exemplary catalyst composition was prepared and characterized, as follows.

Synthesis and Characterization of Framework-Substituted Zeolites

A TiZr-USY zeolite was prepared as described in U.S. Pat. No. 10,293,332, the entire content of which is incorporated herein by reference.

Figure 1:
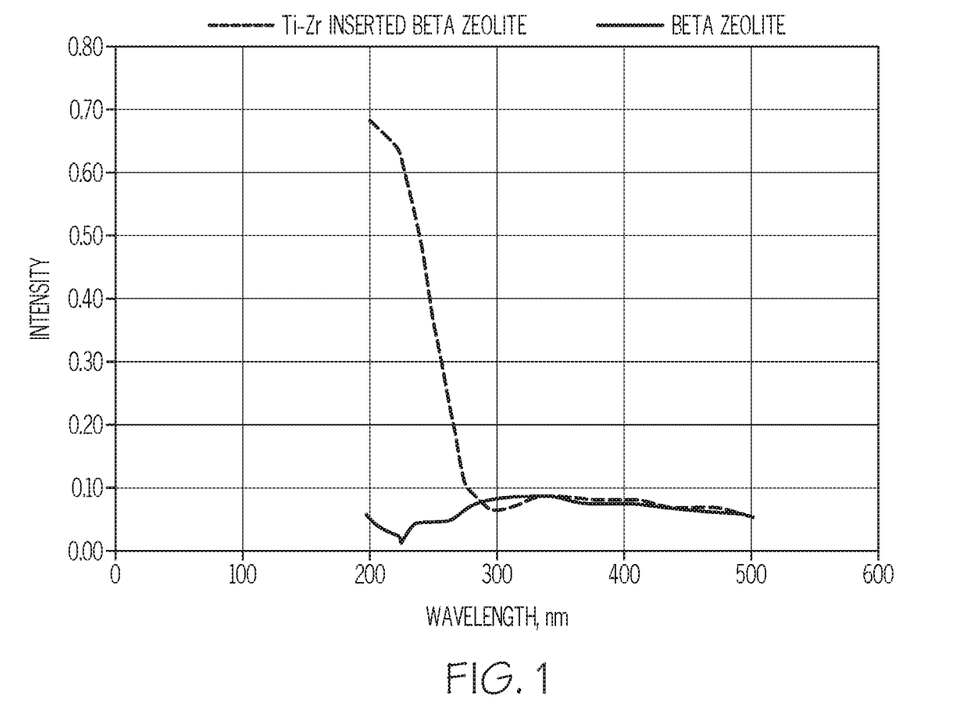
Figure 2:
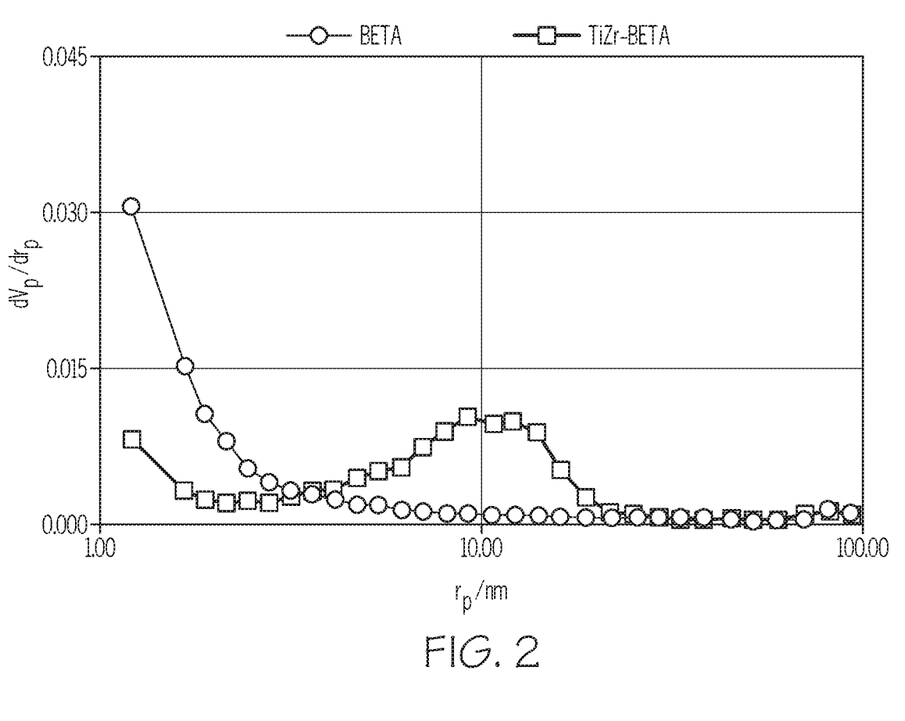
FIG. 2 is a chart of pore volume versus pore diameter of an unsubstituted beta-zeolite and a TiZr-beta zeolite, according to one or more embodiments presently described.

A TiZr-beta zeolite was prepared as described in U.S. Ser. No. 16/589,719, filed Oct. 1, 2019, the entire content of which is incorporated herein by reference. Briefly, a beta zeolite was subjected to an acid treatment with sulfuric acid at 40° C. Titanium sulfate and zirconium sulfate were added to yield 1 wt. % $TiO_2$ and 1 wt. % $ZrO_2$, respectively, to the acid-suspended beta zeolite. The resulting material, after stirring for four hours, was washed with water at 60° C. to remove residual sulfate. UV-Vis analysis using a JASCO V-679 was performed to characterize the TiZr-beta zeolite. As shown by the peak at around 200 nm relative to unsubstituted beta zeolite in FIG. 1, titanium was successfully inserted into the beta zeolite framework. Further, the TiZr-beta zeolite exhibited mesoporosity after being subjected to the acid treatment, as shown by the peak pore diameter in the region of 10 nm in FIG. 2, which was not present in the unsubstituted beta zeolite.

The TiZr-beta zeolite was analyzed to determine its specific surface area (SA) and silica-to-alumina ratio (SAR), and the concentration of $TiO_2$ and $ZrO_2$ present was also determined. The SA and SAR were also determined for an unsubstituted beta zeolite. SA may be determined as described above. Quantitative compositional analysis was determined by X-ray fluorescence spectroscopy (XRF) and the SAR, on a molar basis, was derived from the XRF data. The results of these analyses are presented in Table 1.

TABLE 1

Characterization of the TiZr-Beta Zeolite and the Unsubstituted Beta Zeolite

| Property | TiZr-Beta Zeolite | Unsubstituted Beta Zeolite |
|---|---|---|
| Specific Surface Area ($m^2/g$) | 597 | 535 |
| Silica-to-Alumina Ratio | 57 | 30 |
| $TiO_2$ (wt. %) | 0.67 | N/P[1] |
| $ZrO_2$ (wt. %) | 0.32 | N/P[1] |

[1]N/P = none present

Formulation of Catalyst Compositions

Catalyst Composition 1 was formulated using 5 wt. % TiZr-beta zeolite, 25 wt. % TiZr-USY zeolite, and 70 wt. % alumina-only binder. Catalyst Composition 2 was formulated using 30 wt. % TiZr-USY zeolite and 70 wt. % alumina-only binder. The combined TiZr-USY zeolite and binder are referred to as the "carrier." For purposes of specifying the concentrations of components of the Catalyst Compositions, the hydrogenative component, which for both Catalyst Composition 1 and Catalyst Composition 2 included nickel and molybdenum, were calculated as components of the carrier. The hydrogenative component is added to the carrier concentration to give a concentration with respect to the final catalyst composition (carrier+ metals). For example, a catalyst composition containing 100 kg of carrier and 32 kg of hydrogenative components would have the hydrogenative components at 24 wt. % of the total catalyst composition.

Table 2 provides the compositional analyses of Catalyst Composition 1 and Catalyst Composition 2. Specific surface area and pore volume were determined as follows. Adsorption measuring equipment (e.g., fully automatic gas adsorption equipment "AUTOSORB-1" manufactured by Quantachrome Instruments Corp.) was used to subject 0.02 to 0.05 g of a sample (zeolite or the catalyst composition) to deaeration treatment at room temperature for 5 hours. An adsorption desorption isothermal curve was measured under liquid nitrogen temperature to calculate a specific surface area per mass using a BET equation of a multipoint method. Further, a pore distribution and a pore volume (pore diameter: 600 Å or less) were calculated from a nitrogen adsorption isothermal curve by a BJH method. Compacted bulk density may be determined as follows. The sample was pre-calcined at 500° C. for one hour. The sample was then cooled in a dessicator. A volumetric cylinder was charged with 100 g of the dried sample, which was tamped down. From the volume of the sample, the compacted bulk density was calculated as the weight of the sample divided by its volume.

TABLE 2

Characterization of Catalyst Compositions

| Property | Catalyst Composition 1 | Catalyst Composition 2 |
|---|---|---|
| MoO$_3$ (wt. %) | 16.3 | 16.1 |
| NiO (wt. %) | 4 | 3.9 |
| TiO$_2$ (wt. %) | 0.16 | 0.21 |
| ZrO$_2$ (wt. %) | 0.14 | 0.19 |
| Specific Surface Area (m$^2$/g) | 300 | 330 |
| Pore volume (ml/g) | 0.6 | 0.65 |
| Compacted Bulk Density (ml/g) | 0.67 | 0.65 |

Pilot Plant Hydrocracking Process

Catalyst Composition 1 and Catalyst Composition 2 were both used in a hydrocracking process with a vacuum gas oil (VGO) feed. The VGO had a density of 0.923 g/cm$^3$, a sulfur content of 2.51 wt. %, and a nitrogen content of 960 ppm. The naphtha fraction was considered to be the fraction from the C$_5$ cut point, i.e., about 32° C., to 145° C. The kerosene fraction was considered to be the fraction from 145° C. to 260° C. The gasoil fraction was considered to be the fraction from 260° C. to 360° C. The middle distillate fractions were considered to be the fractions from 145° C. to 360° C. The unconverted bottoms fraction was considered to be any fraction above 360° C.

For the hydrocracking process, a pilot plant was loaded with 100 ml of a commercial pretreat catalyst followed by 100 ml of either the Catalyst Composition 1 or the Catalyst Composition 2. Hydrogen was added to the pilot plant at a partial pressure of 13.5 MPa with a hydrogen/oil ratio of 1000 Nm$^3$/m$^3$. Reactions were performed at 360° C., 375° C., 390° C., and 405° C., sequentially without cooling between increases.

Table 3 provides a measure of the catalytic activity of Catalyst Composition 1 and Catalyst Composition 2, expressed as the temperature at which 50 wt. % conversion was observed. Also, Table 3 provides the wt. % of various distillates obtained using each Catalyst Composition.

TABLE 3

Activity of Catalyst Compositions

| Parameter | Catalyst Composition 1 | Catalyst Composition 2 | Difference[1] |
|---|---|---|---|
| Temperature at 50 wt.% Conversion (° C.) | 378.1 | 380.4 | −2.3 |
| Gas (C$_1$-C$_4$, wt. %) | 1.6 | 1.3 | 0.3 |
| Naphtha (wt. %) | 7.1 | 5.6 | 1.5 |
| Kerosene (wt. %) | 24.7 | 26 | −1.4 |
| Gasoil (wt. %) | 23.6 | 24.1 | −0.5 |
| Middle Distillate (wt. %) | 48.2 | 24.1 | 24.1 |
| Unconverted Bottoms (wt. %) | 42.4 | 42.9 | 0.5 |
| Total (wt. %) | 99.4 | 99.9 | −0.5 |

[1]Catalyst Composition 1 value − Catalyst Composition 2 value

The results show that Catalyst Composition 1, which includes 5 wt. % TiZr-beta zeolite, achieved 50% conversion at a temperature 2.3° C. lower than the temperature at which Catalyst Composition 2, which includes only TiZr-USY zeolite, achieved the same level of conversion when all other variables are significantly similar. In addition, Catalyst Composition 1 produced 0.3 wt. % more C$_1$-C$_4$ gases and 1.5 wt. % more naphtha at the expense of the middle distillates.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A catalyst composition comprising:
   a catalyst support; and
   at least one hydrogenative metal component disposed on the catalyst support, wherein the catalyst support comprises:
   at least one ultra-stable Y-type zeolite having a framework substituted with titanium and zirconium (TiZr-USY zeolite); and
   at least one beta zeolite having a framework substituted with titanium and zirconium (TiZr-beta zeolite).

2. The catalyst composition of claim 1, wherein the at least one TiZr-USY zeolite and the at least one TiZr-beta zeolite are each independently substituted with from 0.1 wt. % to 5 wt. % zirconium atoms and from 0.1 wt. % to 5 wt. % titanium calculated on an oxide basis.

3. The catalyst composition of claim 1, wherein the at least one hydrogenative metal component is selected from the group consisting of chromium, molybdenum, tungsten, iron, cobalt, nickel, copper, ruthenium, rhodium, palladium, silver, osmium, iridium, platinum, gold, and a combination of two or more thereof.

4. The catalyst composition of claim 1, wherein the at least one TiZr-USY zeolite comprises a crystal lattice constant from 2.43 nm to 2.45 nm.

5. The catalyst composition of claim 1, wherein the at least one TiZr-USY zeolite comprises a specific surface area from 600 m$^2$/g to 900 m$^2$/g.

6. The catalyst composition of claim 1, wherein the catalyst composition comprising the at least one TiZr-USY zeolite and the at least one TiZr-beta zeolite comprises a specific surface area from 200 m$^2$/g to 450 m$^2$/g.

7. The catalyst composition of claim 1, wherein the at least one TiZr-USY zeolite comprises a molar ratio of SiO$_2$ to Al$_2$O$_3$ from 10 to 100.

8. The catalyst composition of claim 1, wherein the catalyst composition comprising the at least one TiZr-USY zeolite and the at least one TiZr-beta zeolite comprises a plurality of pores having a diameter of 600 Å or less, the pores having a volume from 0.4 ml/g to 0.75 ml/g.

9. The catalyst composition of claim 1, wherein the at least one hydrogenative metal component comprises from 0.01 wt. % to 40 wt. % of the catalyst composition.

10. The catalyst composition of claim 1, wherein the at least one TiZr-beta zeolite comprises a crystal lattice constant of a=from 1.26 nm to 1.27 nm, b=from 1.26 nm to 1.27 nm, and c=from 26.2 nm to 26.5 nm.

11. The catalyst composition of claim 1, wherein the catalyst support comprises from 70 wt. % to 99 wt. % TiZr-USY zeolite, based on the total zeolite content of the support.

12. The catalyst composition of claim 1, wherein the catalyst support comprises from 1 wt. % to 30 wt. % TiZr-beta zeolite, based on the total zeolite content of the support.

13. The catalyst composition of claim 1, wherein the catalyst support comprises from 1 wt. % to 80 wt. % total TiZr-USY zeolite and TiZr-beta zeolite.

14. A method for hydrocracking hydrocarbon oil, comprising:
  contacting at least one hydrocarbon oil stream with at least one hydrocracking catalyst composition and hydrogen in a reactor in order to hydrocrack the hydrocarbon oil stream, the hydrocracking catalyst composition comprising:
    a catalyst support; and
    at least one hydrogenative metal component disposed on the catalyst support, wherein the catalyst support comprises:
      at least one ultra-stable Y-type zeolite having a framework substituted with titanium and zirconium (TiZr-USY zeolite); and
      at least one beta zeolite having a framework substituted with titanium and zirconium (TiZr-beta zeolite).

15. The method of claim 14, wherein the reactor operates at a temperature from 300° C. to 500° C.

16. The method of claim 14, wherein the hydrocarbon oil has a boiling point from 375° C. to 833° C.

17. The method of claim 14, wherein the hydrogen is added to the reactor at a pressure from 3.5 MPa to 35 MPa.

18. The method of claim 14, wherein the reactor has a hydrogen/oil ratio from 500 Nm$^3$/m$^3$ to 2500 Nm$^3$/m$^3$.

19. The method of claim 14, wherein the reactor has a liquid hourly space velocity from 0.1 per hour to 10 per hour.

20. The method of claim 14, wherein the reactor comprises a flow reactor selected from the group consisting of a stirred tank reactor, an ebullient bed reactor, a baffled slurry tank, a fixed bed reactor, a rotating tubular reactor, a slurry-bed reactor, and a combination of two or more of these.

\* \* \* \* \*

UNITED STATES PATENT AND TRADEMARK OFFICE
CERTIFICATE OF CORRECTION

PATENT NO. : 11,154,845 B1
APPLICATION NO. : 16/940635
DATED : October 26, 2021
INVENTOR(S) : Omer Refa Koseoglu et al.

It is certified that error appears in the above-identified patent and that said Letters Patent is hereby corrected as shown below:

On the Title Page

Item (71), applicant 2, city, delete "Kawasaki" and insert --Saiwai-ku, Kawasaki-shi--, therefor.

Item (73), assignee 2, city, delete "Kawasaki" and insert --Saiwai-ku, Kawasaki-shi--, therefor.

In page 3, Column 1, item (56), other publications, cite no. 6, delete "Catalysisby" and insert --Catalysis by--, therefor.

In page 3, Column 1, item (56), other publications, cite no. 6, delete "int eh" and insert --in--, therefor.

Signed and Sealed this
Twenty-fifth Day of October, 2022

Katherine Kelly Vidal
*Director of the United States Patent and Trademark Office*